United States Patent
Stahl et al.

(10) Patent No.: US 11,764,833 B2
(45) Date of Patent: Sep. 19, 2023

(54) PHASE VALUE DETERMINATION FOR AN NFC CARD EMULATING DEVICE UTILIZING ACTIVE LOAD MODULATION

(71) Applicant: NXP B.V., Eindhoven (NL)

(72) Inventors: Johannes Stahl, Graz (AT); Ulrich Andreas Muehlmann, Graz (AT); Adrian Rafael Krenn, St. Bartholomä (AT)

(73) Assignee: NXP B.V., Eindhoven (NL)

( * ) Notice: Subject to any disclaimer, the term of this patent is extended or adjusted under 35 U.S.C. 154(b) by 174 days.

(21) Appl. No.: 17/452,806

(22) Filed: Oct. 29, 2021

(65) Prior Publication Data

US 2022/0166463 A1    May 26, 2022

(30) Foreign Application Priority Data

Nov. 24, 2020  (EP) ..................................... 20209430

(51) Int. Cl.
  *H04B 5/00*  (2006.01)
  *H04L 5/00*  (2006.01)

(52) U.S. Cl.
  CPC ......... *H04B 5/0062* (2013.01); *H04B 5/0068* (2013.01); *H04L 5/0048* (2013.01)

(58) Field of Classification Search
  CPC .. H04B 5/0025; H04B 5/0031; H04B 5/0043; H04B 5/0062; H04B 5/0068; H04B 5/0081
  See application file for complete search history.

(56) References Cited

U.S. PATENT DOCUMENTS

| | | | |
|---|---|---|---|
| 9,935,689 B2 | 4/2018 | Hueber et al. | |
| 10,396,975 B2 * | 8/2019 | Hung | H03L 7/085 |
| 2013/0038428 A1 * | 2/2013 | Viikari | G01S 13/756 |
| | | | 340/10.4 |
| 2013/0157563 A1 | 6/2013 | Jain et al. | |
| 2018/0034621 A1 | 2/2018 | Hueber et al. | |
| 2019/0067818 A1 * | 2/2019 | Cordier | H01Q 9/045 |
| 2019/0325177 A1 | 10/2019 | Tornambe et al. | |

FOREIGN PATENT DOCUMENTS

EP        3280064 A1     2/2018

* cited by examiner

*Primary Examiner* — Tuan Pham

(57) ABSTRACT

There is described a method of determining a phase value for an NFC card emulating device that enables said NFC card emulating device to communicate in phase with an NFC reader device while utilizing active load modulation, wherein the NFC card emulating device comprises a card antenna and the NFC reader device comprises a reader antenna, the method comprising receiving a reader signal from the NFC reader device at the NFC card emulating device through coupling of the card antenna and the reader antenna, the reader signal comprising a subcarrier modulation; estimating a resonance frequency of a system corresponding to the coupled card antenna and reader antenna based on the received communication signal; and determining the phase value based on the estimated resonance frequency and a set of parameters that represents a predetermined reference system. Furthermore, an NFC card emulating device, an NFC system, and a computer program are described.

19 Claims, 4 Drawing Sheets

PHASE VALUE DETERMINATION FOR AN NFC CARD EMULATING DEVICE UTILIZING ACTIVE LOAD MODULATION

CROSS-REFERENCE TO RELATED APPLICATIONS

This application claims priority under 35 U.S.C. § 119 to European Patent Application No. 20209430.6, filed on Nov. 24, 2020, the contents of which are incorporated by reference herein.

TECHNICAL FIELD

The present disclosure relates to the field of Near Field Communication (NFC) technology. More specifically, the present disclosure relates to methods, devices, systems, and computer programs for determining a phase value for an NFC card emulating device that enables said NFC card emulating device to communicate in phase with an NFC reader device while utilizing active load modulation.

ART BACKGROUND

Near field communication (NFC) devices, e.g. NFC enabled mobile phones, can be configured to perform the card to reader communication by active load modulation (ALM). Contrary to passive load modulation (PLM), in ALM configuration, the antenna of the device that emulates the card is actively driven. To ensure interoperability with NFC readers that expect a passively modulating counterpart, the signal generated at the reader antenna shall be equal for both ALM and PLM. This prerequisite means (among other constraints) that the carrier signals generated by the card emulating device and the reader need to be aligned in phase. In the following, the corresponding carrier phase setting of the card emulator is denoted initial phase.

In general, the overall communication system causes a phase offset, which shall be compensated by setting the initial phase. One problem that arises in this context is that different matching networks and antennas cause different phase offsets. This limits interoperability across NFC devices. The phase synchronicity problem is further aggravated by the fact that the system's phase response varies depending on the position of the card emulating device in the reader field. One reason for this behavior is the detuning of the reader and card antenna resonator which depends on the specific devices under test and the communication distance. Finding a fixed initial phase that ensures successful ALM communication for all scenarios is hence a challenging task. Moreover, if the overall device's synchronization performance is bad, it may be impossible to find a correct initial phase offset setting.

Known systems are limited to a static initial phase setup. The initial phase setting is found by evaluating the performance as a function of communication distance and initial phase with all readers of interest in the laboratory. Finally, an initial phase setting that is admissible, i.e. that lies in the so-called phase window for all tested communication scenarios, is chosen. Under normal laboratory conditions, a phase window of 10° to 20° can be achieved. However, there exist scenarios where the individual reader-dependent phase windows do not overlap and hence no global static initial setting that guarantees successful communication can be found.

There may thus be a need for a way of determining the initial phase without the above-mentioned drawbacks associated with a fixed initial phase setting.

SUMMARY

This need may be met by the subject matter according to the independent claims. Advantageous embodiments are set forth in the dependent claims.

According to a first aspect, there is provided a method of determining a phase value for an NFC card emulating device that enables said NFC card emulating device to communicate in phase with an NFC reader device while utilizing active load modulation. The NFC card device comprises a card antenna and the NFC reader device comprises a reader antenna. The method comprises receiving a reader signal from the NFC reader device at the NFC card emulating device through coupling of the card antenna and the reader antenna, the reader signal comprising a subcarrier modulation, estimating a resonance frequency of a system corresponding to the coupled card antenna and reader antenna based on the received communication signal, and determining the phase value based on the estimated resonance frequency and a set of parameters that represents a predetermined reference system.

This aspect is based on the idea that an NFC card emulating device, such as an NFC enabled mobile phone, receives a reader signal from a reader device and, based on the received signal, estimates a resonance frequency of the system corresponding to the coupled antennas of the NFC card emulating device and the reader device. Thereafter, the NFC card emulating device determines a phase value based on the estimated resonance frequency and a set of parameters representing a predetermined reference system. The thus determined phase value is used to communicate in phase with the NFC reader device utilizing active load modulation, i.e. to send an NFC signal in response to the reader signal.

In other words, the phase value is determined at the beginning of an NFC session and thus assures phase alignment with the reader device under the given circumstances in a dynamic manner without the drawbacks of a static initial phase setting.

According to an embodiment, the step of estimating the resonance frequency comprises calculating a discrete Fourier transform (DFT) for at least a part of the received reader signal; and estimating the resonance frequency based on a first and a second value of the discrete Fourier transform, wherein the first value corresponds to a first frequency and the second value corresponds to a second frequency.

In other words, two values (first and second values) of the DFT calculated based on the received reader signal are used to estimate the resonance frequency, wherein the two values of the calculated DFT correspond to two frequencies (first and second frequency).

According to a further embodiment, the method further comprises calculating a ratio between a magnitude of the first value and a magnitude of the second value; and applying a first function to the calculated ratio to estimate the resonance frequency.

In other words, a first function is applied to the ratio of the magnitudes of the first and second values in order to estimate the resonance frequency.

According to a further embodiment, the first function maps the calculated ratio to a dominant pole of the system corresponding to the coupled card antenna and reader antenna.

In this embodiment, it is assumed that the communication channel between the reader device and the card emulating device is dominated by the resonator formed by the reader antenna and card antenna, and that this dominant resonator can be modelled as a one-pole system.

According to a further embodiment, the first frequency corresponds to one of an upper sideband and a lower sideband of the subcarrier modulation, and the second frequency corresponds to the other one of the upper sideband and the lower sideband of the subcarrier modulation.

In this embodiment, the first and second values are the DFT values at the upper and lower sideband frequencies of the subcarrier modulation.

According to a further embodiment, the subcarrier modulation comprises a square wave at a subcarrier frequency.

In other words, the NFC subcarrier modulation can be represented as a sum of harmonically related sinusoids and the frequencies of the upper and lower sidebands are thus known.

According to a further embodiment, determining the phase value comprises applying a second function to the estimated resonance frequency and the set of parameters representing the reference system.

In other words, the phase value is determined as a (second) function of the estimated resonance frequency and the parameters of the reference system.

According to a further embodiment, the second function is a predetermined function obtained by training measurements within the reference system.

For example, the second function may be obtained by performing a series of training measurements in a laboratory installation. In particular, training measurements may be performed at a wide range of different positional relationships between an NFC card emulating device and NFC reader devices. The reference system is then trained by optimizing its parameters to fit the measurement data.

According to a further embodiment, the method further comprises selecting the set of parameters from a plurality of sets of parameters, wherein each set of parameters in the plurality of sets of parameters represents one of a plurality of reference systems.

In other words, a specific parameter set is available for each of a plurality of reference systems and one of these parameter sets is selected.

According to a second aspect, there is provided an NFC card emulating device for communicating with an NFC reader device utilizing active load modulation. The NFC card emulating device comprises a card antenna adapted to couple with a reader antenna of the NFC reader device, and a receiver circuit adapted to receive a reader signal from the NFC reader device through coupling of the card antenna and the reader antenna, the reader signal comprising a subcarrier modulation. The device further comprises a phase determining circuit adapted to estimate a resonance frequency of a system corresponding to the coupled card antenna and reader antenna based on the received reader signal, and to determine a phase value based on the estimated resonance frequency and a set of parameters that represents a predetermined reference system. The device further comprises a transmitter circuit adapted to transmit a response signal to the NFC reader device utilizing active load modulation, wherein the phase value is used to align the phase of the response signal with the phase of the reader signal.

This aspect is essentially based on the same idea as the first aspect discussed above and provides a device capable of implementing and performing the method according to the first aspect. More specifically, the NFC card emulating device, such as an NFC enabled mobile phone, is configured to receive a reader signal from a reader device via coupling of the card and reader antennas. The phase determining circuit is configured to estimate the resonance frequency of the system corresponding to the coupled antennas of the NFC card emulating device and the reader device based on the received signal, and to determine a phase value based on the estimated resonance frequency and a set of parameters representing a predetermined reference system. The transmitter circuit is configured to use the determined phase value to transmit a response signal to the NFC reader device and thereby communicate in phase with the NFC reader device utilizing active load modulation.

In other words, the NFC card emulating device is capable of determining a phase value at the beginning of an NFC session and thereby assuring phase alignment with the reader device under the given circumstances in a dynamic manner without the drawbacks of a static initial phase setting.

According to a further embodiment, the phase determining circuit is further adapted to calculate a discrete Fourier transform for at least a part of the received reader signal, and to estimate the resonance frequency based on a first and a second value of the discrete Fourier transform, wherein the first value corresponds to a first frequency and the second value corresponds to a second frequency.

In other words, the phase determining circuit is configured to use two values (first and second values) of the DFT calculated based on the received reader signal to estimate the resonance frequency. The two values of the calculated DFT correspond to two frequencies (first and second frequencies).

According to a further embodiment, the phase determining circuit is further adapted to calculate a ratio between a magnitude of the first value and a magnitude of the second value, and to apply a first function to the calculated ratio to estimate the resonance frequency.

In other words, the phase determining circuit is configured to apply a first function to the ratio of the magnitudes of the first and second values in order to estimate the resonance frequency.

According to a further embodiment, the first function maps the calculated ratio to a dominant pole of the system corresponding to the coupled card antenna and reader antenna.

In this embodiment, it is assumed that the communication channel between the reader device and the card emulating device is dominated by the resonator formed by the reader antenna and card antenna, and that this dominant resonator can be modelled as a one-pole system.

According to a further embodiment, the first frequency corresponds to one of an upper sideband and a lower sideband of the subcarrier modulation, and the second frequency corresponds to the other one of the upper sideband and the lower sideband of the subcarrier modulation.

In this embodiment, the first and second values are the DFT values at the upper and lower sideband frequencies of the subcarrier modulation.

According to a further embodiment, the subcarrier modulation comprises a square wave at a subcarrier frequency.

In other words, the NFC subcarrier modulation can be represented as a sum of harmonically related sinusoids and the frequencies of the upper and lower sidebands are thus known.

According to a further embodiment, the phase determining circuit is further adapted to apply a second function to the estimated resonance frequency and the set of parameters representing the reference system in order to determine the phase value.

In other words, the phase determining circuit determines the phase value as a (second) function of the estimated resonance frequency and the parameters of the reference system.

According to a further embodiment, the second function is a predetermined function obtained by training measurements within the reference system.

For example, the second function may be obtained by performing a series of training measurements within the reference system in a laboratory installation. In particular, training measurements may be performed at a wide range of different positional relationships between an NFC card emulating device and a reference NFC reader device.

According to a further embodiment, the device further comprises a selecting unit adapted to select the set of parameters from a plurality of sets of parameters, wherein each set of parameters in the plurality of sets of parameters represents one of a plurality of reference systems.

In other words, a specific parameter set is available for each of a plurality of reference systems and the selecting circuit is configured to select one of these parameter sets.

According to a third aspect, there is provided an NFC system. The system comprises an NFC reader device having a reader antenna, and an NFC card emulating device adapted to communicate with the NFC reader device utilizing active load modulation. The NFC card emulating device comprises a card antenna adapted to couple with the reader antenna, and a receiver unit adapted to receive a reader signal from the NFC reader device through coupling of the card antenna and the reader antenna, the reader signal comprising a subcarrier modulation. The NFC card emulating device further comprises a phase determining unit adapted to estimate a resonance frequency of a system corresponding to the coupled card antenna and reader antenna based on the received reader signal, and to determine a phase value based on the estimated resonance frequency and a set of parameters that represents a predetermined reference system. The NFC card emulating device further comprises a transmitter unit adapted to transmit a response signal to the NFC reader device utilizing active load modulation, wherein the phase value is used to align the phase of the response signal with the phase of the reader signal.

The system according to this aspect is essentially based on the same idea as the first and second aspects described. More specifically, the system comprises an NFC reader device and an NFC card emulating device according to the second aspect.

According to a fourth aspect, there is provided a computer program for determining a phase value for an NFC card emulating device that enables said NFC card emulating device to communicate in phase with an NFC reader device while utilizing active load modulation, wherein the NFC card device comprises a card antenna and the NFC reader device comprises a reader antenna. The computer program comprises computer executable instructions which, when executed by a processing unit of the NFC card emulating device, causes the device to perform the following steps: receiving a reader signal from the NFC reader device at the NFC card emulating device through coupling of the card antenna and the reader antenna, the reader signal comprising a subcarrier modulation, estimating a resonance frequency of a system corresponding to the coupled card antenna and reader antenna based on the received communication signal, and determining the phase value based on the estimated resonance frequency and a set of parameters that represents a predetermined reference system.

This aspect is essentially based on the same idea as the first and second aspects described above and provides a computer program capable of implementing and performing the method according to the first aspect.

It should be noted that embodiments of the present disclosure have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present disclosure will be apparent from the examples of embodiment to be described hereinafter and are explained with reference to the examples of embodiment. Aspects of the present disclosure will be described in more detail hereinafter with reference to examples of embodiment to which the present disclosure is, however, not limited.

DETAILED DESCRIPTION

Figure 1:
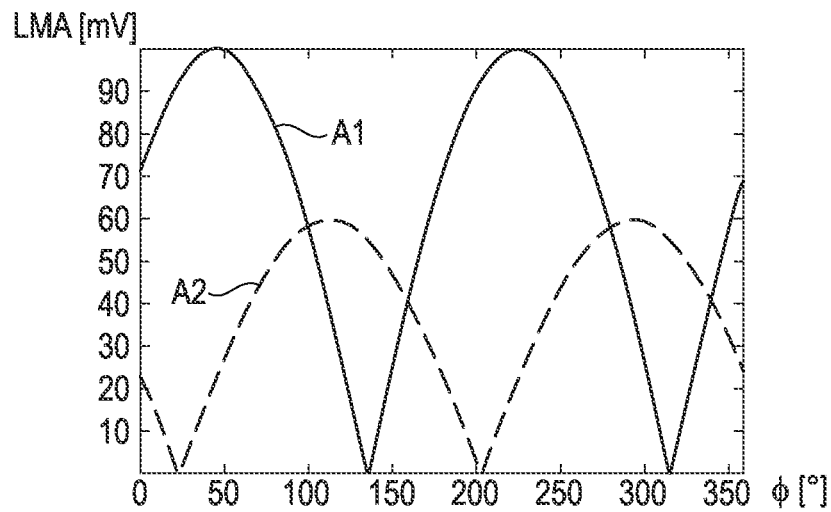
FIG. 1 shows an illustration of load modulation amplitude (LMA) on reader side as a function of initial phase setting on card emulator side in two different scenarios.

The illustration in the drawing is schematic. It is noted that in different figures, similar or identical elements are provided with the same reference signs or with reference signs, which differ only within the first digit.

FIG. 1 shows an illustration of load modulation amplitude LMA (in mV) on reader side as a function of initial phase setting $\phi$ (in degrees) on card emulator side in two different scenarios. More specifically, FIG. 1 shows the relation between LMA and $\phi$ when a reader device receives a signal transmitted from a card emulating device that utilizes active load modulation and the initial phase setting $\phi$. The curve A1 corresponds to a first scenario (i.e. a first combination of card emulating device and reader device under first conditions) while the curve A2 corresponds to a second scenario (i.e. a second combination of card emulating device and reader device under second conditions).

Small LMA values cause zones, where the reader device cannot detect the modulations anymore. The width of these "blind zones" depends on the sensitivity of the reader device on the one hand, and on the phase and frequency stability of the ALM signal on the other hand. The locations of the LMA maxima and minima are not fixed and depend on a number of features and characteristics, including e.g. matching networks, antennas, process and component variations, and communication distance.

Figure 2A:
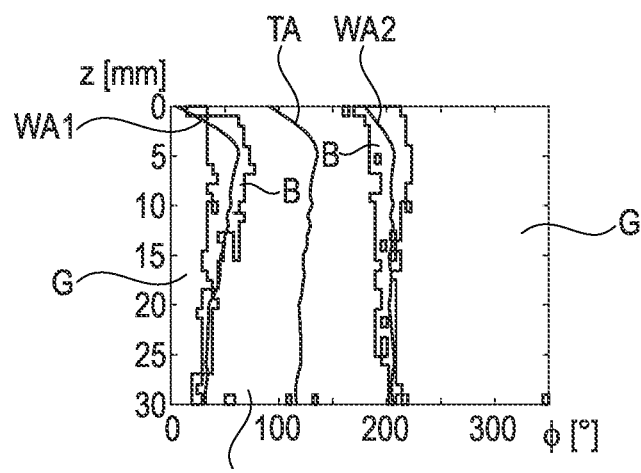
FIG. 2A shows a diagram of communication performance in dependency on initial phase setting and distance between card emulating device and reader device in one scenario.
Figure 2B:
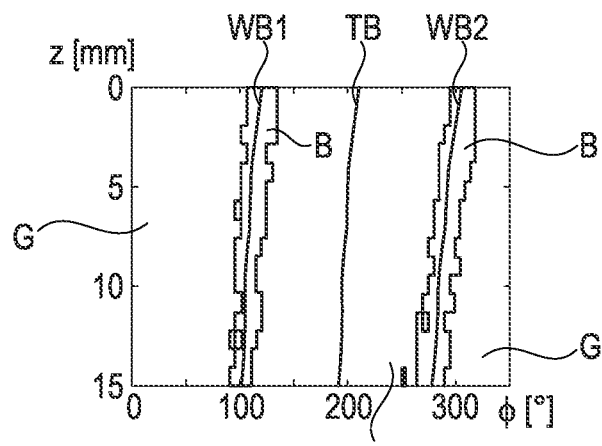
FIG. 2B shows a diagram of communication performance in dependency on initial phase setting and distance between card emulating device and reader device in another scenario.

To illustrate the dependence between performance and the specific communication scenario, FIG. 2A and FIG. 2B show the communication performance as a function of initial phase setting ϕ (in degrees) and communication distance z (in mm) for two different NFC reader terminals. The "bad" zones B correspond to regions where the reader device is not able to detect any modulation since the LMA is too small. The "good" zones G indicate zero communication fails. Throughout this document, connected initial phase zones which allow for successful communication across all communication distances will be denoted "phase window". The curves WA1, TA, WA2, WB1, TB, and WB2 are a result of post-processing. More specifically, the curves WA1, WA2, WB1, and WB2 correspond to local maxima of the number of fails, i.e. the worst combinations of z and ϕ, while the curves TA and TB represent those initial phase values that have maximum distance to these local maxima, i.e. each curve TA, TB may be considered as a target optimal initial phase.

Clearly, without dynamic adjustment of the initial phase, one needs to choose a setting that yields satisfactory performance over all distances and possible reader devices. Depending on the performance constraints and the targeted set of reader terminals this may be impossible.

Known systems are limited to a static initial phase setup. The initial phase setting is found by evaluating the performance as a function of communication distance and initial phase with all readers of interest in the laboratory. Finally, an initial phase setting that is admissible, i.e. that lies in the so-called phase window for all tested communication scenarios, is chosen. Under normal laboratory conditions, a phase window of 10° to 20° can be achieved. However, there exist scenarios where the individual reader-dependent phase windows do not overlap and hence no global static initial setting that guarantees successful communication can be found.

The present disclosure presents ways of compensating for the abovementioned effects and can thus be used to improve and stabilize ALM-based NFC performance. To achieve this, the present disclosure relies on two steps. First, the system's resonance frequency is estimated from received data by using a simplified model of the overall system. Second, the phase shift of a reference system at this frequency is compensated. The reference system can be trained offline.

Figure 3:
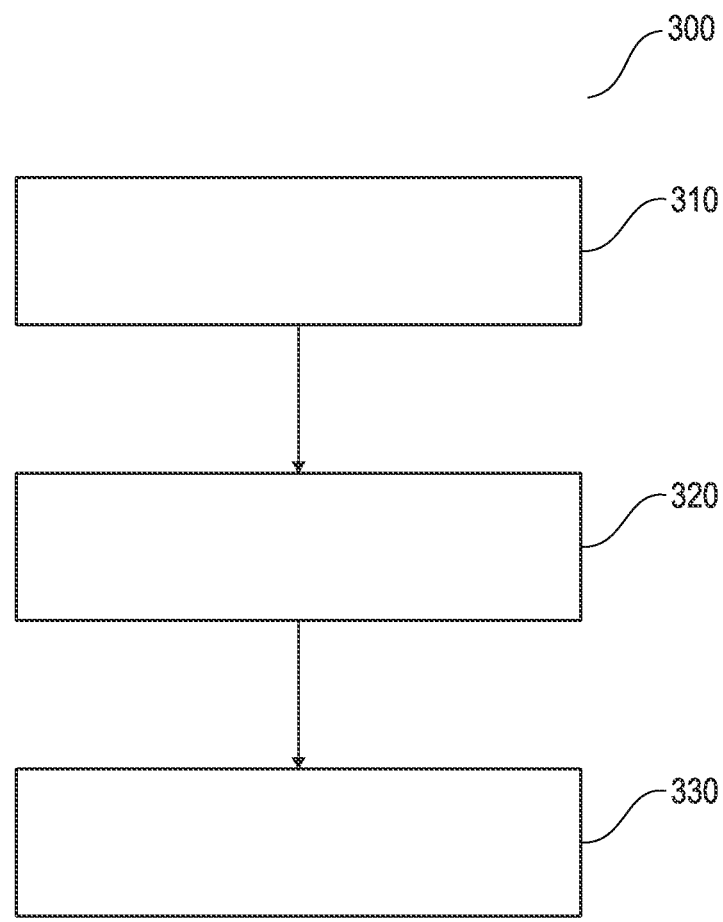
FIG. 3 shows a flowchart of a method according to an embodiment the present disclosure.

FIG. 3 shows a flowchart 300 of a method according to the present disclosure, i.e. a method of determining a phase value for an NFC card emulating device that enables said NFC card emulating device to communicate in phase with an NFC reader device while utilizing active load modulation. The NFC card emulating device comprises a card antenna and the NFC reader device comprises a reader antenna.

At 310, a reader signal is received from the NFC reader device at the NFC card emulating device through coupling of the card antenna and the reader antenna, the reader signal comprising a subcarrier modulation. At 320, a resonance frequency of a system corresponding to the coupled card antenna and reader antenna is estimated based on the received communication signal. At 330, the phase value is determined based on the estimated resonance frequency and a set of parameters that represents a predetermined reference system.

The proposed method relies on the assumption, that the communication channel between the reader device and the card emulating device is dominated by the resonator that is formed by the antennas of the two devices, i.e. the reader antenna and the card antenna. This resonator is subject to detuning in high coupling scenarios, i.e. when the antennas are placed close to each other. Detuning refers to a movement of the resonance frequency of a resonator with regard to the frequency which the system was originally tuned to. Hence, detuning correspondingly affects the phase response of the system. This effect is very well visible in FIG. 2A discussed above, where the phase window moves as a function of communication distance. The resonance frequency is not only a function of coupling but will also be affected by component variations.

As a simplification, the dominant resonator is modelled as a one-pole system. The z-transform of the impulse response h[n] (where n is the discrete-time index) of a one-pole system is given by $$H(z) = G \frac{z}{z-a}. \tag{1}$$

Here, z is the complex-valued independent variable, G is a complex-valued gain and a is the complex-valued pole of the system. The angle of the pole represents the normalized angular resonance frequency, and its absolute value defines the quality factor of the resonance.

Typically, the channel must be excited by a broadband signal in order to estimate its impulse response. However, in order to estimate the complex-valued pole in Equation (1) from measured data, it is only necessary to excite the channel with two tones. The simple parametric one-pole model hence allows for a sparse excitation signal to determine its impulse response (up to a scaling factor and a global time shift).

The NFC reader modulates the carrier with a square wave at a specific frequency (the subcarrier frequency). The square wave can be represented by a sum of harmonically related sinusoids. This means that the channel is excited by the subcarrier fundamental and the associated harmonics. Hence, the proposed method relies on analyzing the lower and the upper sideband of the reader's subcarrier modulation. As will be discussed further below, the ratio of the upper and lower sidebands' magnitudes can be used to obtain an estimate â of the pole a. Note, however, that any other method that is capable of handling the sparse characteristics of the excitation signal may be used to determine the pole in Equation (1).

Figure 4:
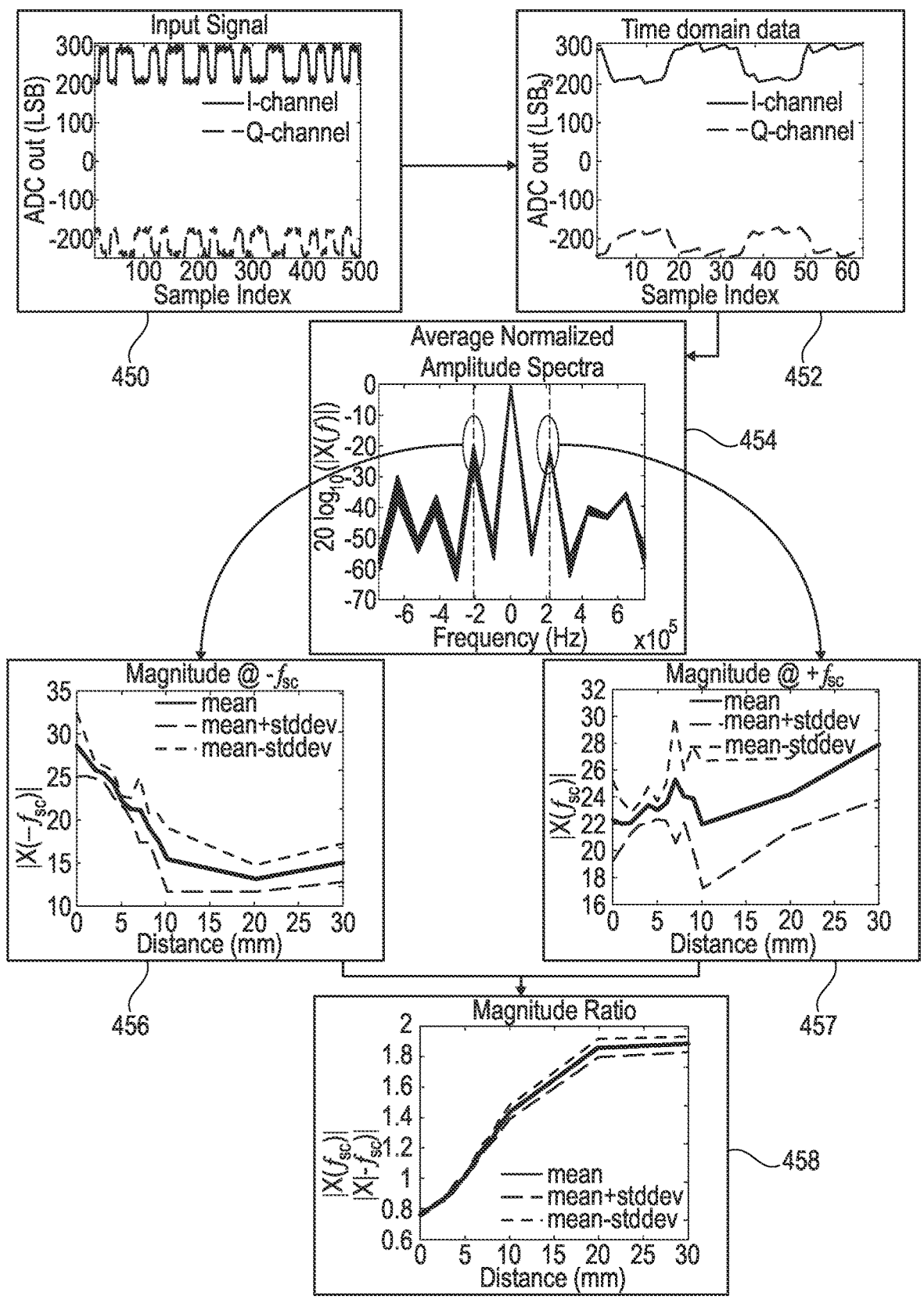
FIG. 4 shows an illustration of a series of computation steps for determining a relationship between side band magnitude ratio and communication distance.

Without loss of generality, the steps to estimate pole a from the magnitude ratio of the upper and lower sidebands of the reader's subcarrier modulation will now be described. FIG. 4 illustrates the individual computation steps resulting in the magnitude ratio for real-world data and a communication distance ranging from 0 mm to 30 mm. Starting from time-domain data 450, an arbitrary signal segment 452 (64 samples in this case) is selected and the discrete Fourier transform (DFT) 454 is computed. Then, two spectral sampling points, in this case the upper and lower sidebands of the subcarrier modulation, are evaluated in terms of their respective magnitude 456, 457 and used to compute a respective magnitude ratio 458. Any other measure of the spectrum's asymmetry around the carrier may be used, depending on the expected signal characteristics. As can be seen from 458, the magnitude ratio decreases as the communication distance decreases, which is an indicator of detuning. This monotonic behavior is in contrast to other measures such as received signal strength, which due to the detuning effect may become ambiguous with regard to communication distance. An example of how to estimate the pole from this data is given further below (see in particular Equation (2)).

Based on the result of fitting a one-pole system to the received data, the initial phase value is controlled by mapping the estimated resonance frequency to a concrete phase value. In the present disclosure, the concept of a reference system that can be trained offline is used. The initial phase value shall be chosen to compensate for the phase deviation between the fitted system and a reference system. It is further possible to define multiple classes of reference systems, where each class corresponds to a different phase mapping.

This means that during reception of a signal from the reader device, the card emulating device can estimate the dominant one-pole resonator, identify the class, the current reader belongs to, and accordingly select the correct initial phase. The fact that the proposed algorithm can be used during reception means that the initial phase can be set before the first response is sent.

Figure 5:
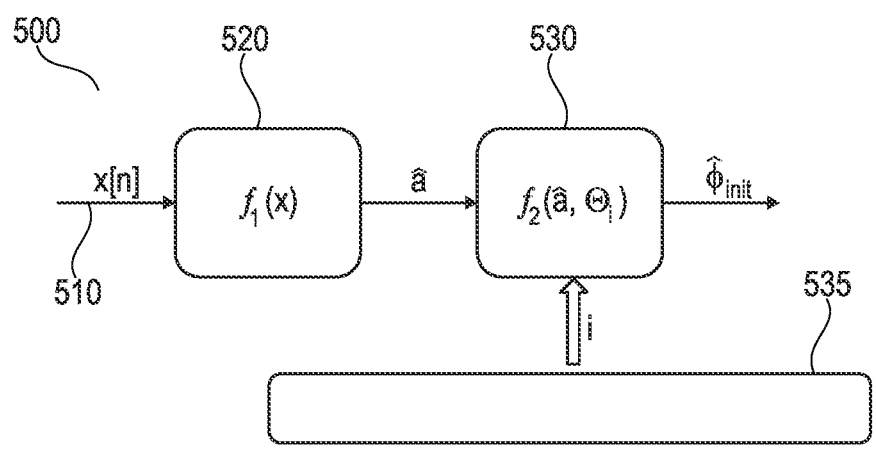
FIG. 5 shows a functional block diagram of a method according to an embodiment of the present disclosure.

FIG. 5 illustrates a functional block diagram 500 of the proposed method. The time-domain reader signal x[n] is received at 510 and the resonator pole estimate a is determined at 520 by applying a first function $f_1(x)$ to the reader signal. The first function $f_1(x)$ thus represents an estimator of the resonator pole a. Then, at 530, a second function $f_2(\hat{a}, \theta_i)$ which represents the actual phase predictor is applied to determine the initial phase value estimate $\hat{\phi}_{init}$ based on the pole (or resonance frequency) estimate $\hat{a}$ and a set of parameters, represented as vector $\theta_i$, of a reference system with index i. The index i is provided by block 535, which is configured to determine which reference system to apply. Block 535 determines the index i by evaluating additional input data, e.g. the received signal strength. For example, the card emulator can be configured to apply reference system i=1 for a received signal strength up to a certain threshold, if the received signal strength exceeds this threshold, reference system i=2 is selected. The mapping from threshold values to reference system index i is variable but predefined and stored in memory (RAM/ROM). The phase predictor represented by the second function $f_2(\hat{a}, \theta_i)$ is preferably trained offline. In general, any mapping from a measured parameter to a target phase value is feasible, as long as it is not ambiguous, i.e. as long as the function $f_2(\hat{a}, \theta_i)$ is bijective.

Figure 6:
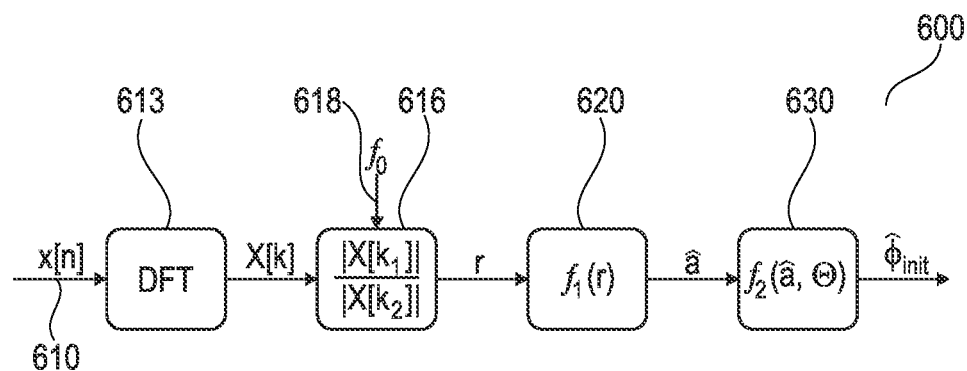
FIG. 6 shows a functional block diagram of a further embodiment of the present disclosure.

FIG. 6 shows a functional block diagram 600 of a further embodiment of the present disclosure. While the overall structure of this embodiment is similar to that shown in FIG. 5, FIG. 6 provides some additional details which are explained in the following. Again, the time-domain reader signal x[n] is received at 610. At 613, an algorithm implementing the DFT is applied to determine the frequency domain representation X[k] which in turn is supplied to block 616. The mapping of DFT bin index k to frequency f is depicted in Equation (3). Here, i.e. at 616, a ratio r between the DFT values $X[k_1]$ and $X[k_2]$ at two different frequencies, preferably the upper and lower sidebands of the subcarrier modulation of the reader signal, i.e. frequencies corresponding to the subcarrier $+/-f_0$ which is supplied at 618. The resulting DFT ratio r is supplied to block 620 where a first function $f_1$ is applied to determine the dominant pole estimate â. Finally, at 630, a second function $f_2$ is applied to the dominant pole estimate â and parameter vector $\theta$ to obtain the estimate of the optimal initial phase value $\hat{\phi}_{init}$. It should be noted that blocks 620 and 630 may also be implemented as a single block.

The calculations in FIG. 6 will now be described in more detail. As explained above, the specific characteristics of the NFC signal make it possible to determine the dominant pole in baseband by evaluating a small set of DFT bins that are associated with excited frequencies. For example, selecting frequencies $+f_0$ and $-f_0$, a simple expression for calculating the dominant pole of the system in Equation (1) can be found:

$$\hat{a} = \frac{re^{j\theta_0} + e^{-2j\theta_0}\sqrt{re^{2j\theta_0} - 2re^{4j\theta_0} + re^{6j\theta_0}} - e^{-j\theta_0}}{r-1}, \quad (2)$$

with normalized angular frequency $$\theta_0 = \frac{2\pi f_0}{f_s} = \frac{2\pi k_0}{N_{DFT}}, \quad (3)$$

where $f_s$ is the sampling frequency, $N_{DFT}$ is the DFT length, and $k_0$ is the DFT bin index associated with frequency $f_0$. Further, the amplitude ratio is given as $$r = \frac{|X[k_0]|}{|X[N_{DFT} - k_0]|}, \quad (4)$$

where $X[k_0]$ is the DFT of the sampled received signal x[n] at DFT bin index $k_0$.

This is only one way to estimate the parameter of interest from the sparse spectrum of the received signal, any other method that exploits the fact that dominant characteristics of the system are modeled by a single parameter may be used.

An important aspect of the training procedure for obtaining $f_2(\hat{a}, \theta_i)$ is the cost function that is optimized and that needs to take into account phase wrapping. An exemplary cost function that represents a cyclic squared error between target and input phase is $$\text{Cost}(\hat{\phi}_{init}, \phi_{init}) = (e^{j\hat{\phi}_{init}} - e^{j\phi_{init}})^H (e^{j\hat{\phi}_{init}} - e^{j\phi_{init}}), \quad (5)$$

where $\hat{\phi}_{init}$ is a vector that consists of the phase values that are predicted by $f_2$, $\phi_{init}$ contains the target optimal phase values, and H indicates the Hermitian transpose of a vector. Any other cost function that takes the wrapping of the phase into account may be used. Cost functions that do not take the wrapping into account will fail, as the training cannot converge.

The target initial phase vector, $\phi_{init}$, which is the training target, can be obtained in several ways, including
  measuring LMA as a function of initial phase (the target phase values correspond to LMA maxima) or
  measuring performance as a function of initial phase (the target phase values correspond to those values that have maximum distance to the blind zones of the readers), e.g. the curves TA, TB in FIG. 2A and FIG. 2B.

When using multiple reference systems, the training samples, i.e. measured data and target values, need to be pre-grouped accordingly to ensure meaningful optimization results. Preferably, double-pole systems may be used with z-Transform $$H_i(z) = G_i \frac{z^2}{(z-a_i)^2}, \tag{6}$$

with complex-valued gain $G_i$ and a double-pole at $a_i$. The rationale behind this choice is the fact that the two coupled antennas actually form a two-pole resonator, which affects the phase shift accordingly. The phase predictor is designed to compensate for the phase of this system at the estimated resonance frequency $\hat{f}_{res}$, which is connected to the estimated pole as follows:

$$\hat{\theta}_{res} = 2\pi \frac{\hat{f}_{res}}{f_s} = \angle \hat{a}, \tag{7}$$

where $f_s$ is the sampling frequency and $\hat{\theta}_{res}$ is the normalized angular representation of the resonance frequency. Hence, the overall phase predictor function is given by $$\hat{\phi}_{init} = -\angle H_i(z=e^{j\hat{\theta}_{res}}) = 2\angle(e^{j\hat{\theta}_{res}} - a_i) - \angle G_i - 2\hat{\theta}_{res}. \tag{8}$$

It can be seen that the parameter vector θ which is being optimized during training consists of three elements: $|a_i|$, $\angle a_i$, and $\angle G_i$.

Figure 7:
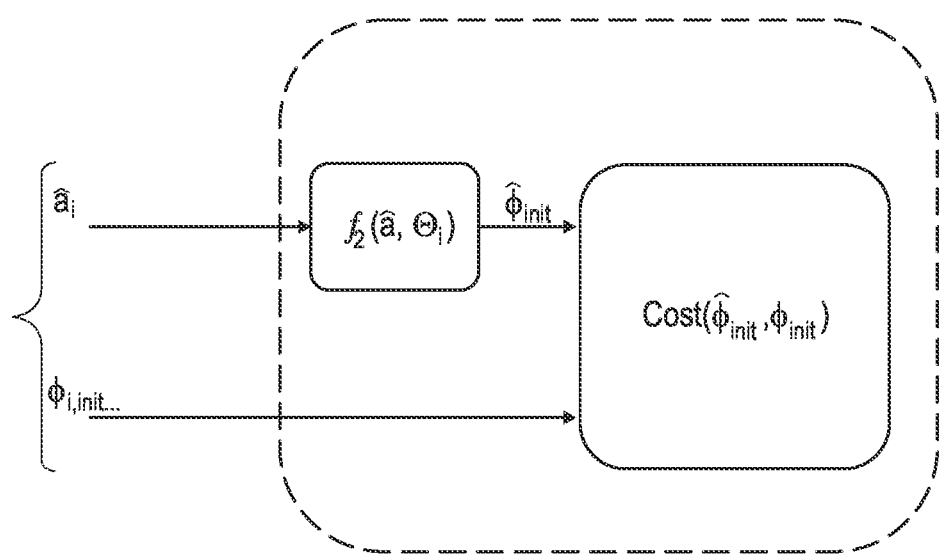
FIG. 7 shows an illustration of a setup for reference system training in accordance with an embodiment of the present disclosure.

FIG. 7 shows an illustration of a setup for offline reference system training in accordance with an embodiment of the present disclosure. The training procedure involves the following steps:

1) Load/generate training data, i.e. input data (in the present case the estimated poles) and target output data (the associated optimal initial phase settings according to measurements or theoretical insights).

2) Initialize the parameters of the phase predictor model that is being optimized.

3) Compute phase predictions based on the model parameters and the input data, e.g. Equation (9).

4) Use the cost function, e.g. Equation (6), to evaluate the error between predicted phase value and target phase value.

5) Update phase predictor parameters based on cost.

6) Repeat steps 4) and 5) until convergence.

In an actual implementation, the intermediate processing steps, like computation of the system pole estimates, can be replaced by a LUT (look-up table) that directly maps the measured asymmetry of the spectrum to an initial phase setting. However, for the generation of the LUT and any classification mechanism, it is advantageous to use a physical meaningful mapping as this helps with both interpretation and optimization of the obtained parameters.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also, elements described in association with different embodiments may be combined. It should also be noted that reference signs in the claims should not be construed as limiting the scope of the claims.

The invention claimed is:

1. A method of determining a phase value for an NFC card emulating device that enables said NFC card emulating device to communicate in phase with an NFC reader device while utilizing active load modulation, wherein the NFC card emulating device comprises a card antenna and the NFC reader device comprises a reader antenna, the method comprising:

receiving a reader signal from the NFC reader device at the NFC card emulating device through coupling of the card antenna and the reader antenna, the reader signal comprising a subcarrier modulation;

estimating a resonance frequency of a system corresponding to the coupled card antenna and reader antenna based on the received communication signal; and determining the phase value based on the estimated resonance frequency and a set of parameters that represents a predetermined reference system.

2. The method according to claim 1, wherein estimating the resonance frequency comprises:

calculating a discrete Fourier transform for at least a part of the received reader signal; and estimating the resonance frequency based on a first and a second value of the discrete Fourier transform, wherein the first value corresponds to a first frequency and the second value corresponds to a second frequency.

3. The method according to claim 2, further comprising:

calculating a ratio between a magnitude of the first value and a magnitude of the second value; and applying a first function to the calculated ratio to estimate the resonance frequency.

4. The method according to claim 3, wherein the first function maps the calculated ratio to a dominant pole of the system corresponding to the coupled card antenna and reader antenna.

5. The method according to claim 2, wherein the first frequency corresponds to one of an upper sideband and a lower sideband of the subcarrier modulation, and wherein the second frequency corresponds to the other one of the upper sideband and the lower sideband of the subcarrier modulation.

6. The method according to claim 1, wherein the subcarrier modulation comprises a square wave at a subcarrier frequency.

7. The method according to claim 1, wherein determining the phase value comprises applying a second function to the estimated resonance frequency and the set of parameters representing the reference system.

8. The method according to claim 7, wherein the second function is a predetermined function obtained by training measurements within the reference system.

9. The method according to claim 1, further comprising selecting the set of parameters from a plurality of sets of parameters, wherein each set of parameters in the plurality of sets of parameters represents one of a plurality of reference systems.

10. An NFC card emulating device for communicating with an NFC reader device utilizing active load modulation, the NFC card emulating device comprising:

a card antenna adapted to couple with a reader antenna of the NFC reader device;

a receiver circuit adapted to receive a reader signal from the NFC reader device through coupling of the card antenna and the reader antenna, the reader signal comprising a subcarrier modulation;

a phase determining circuit adapted to:

estimate a resonance frequency of a system corresponding to the coupled card antenna and reader antenna based on the received reader signal; and determine a phase value based on the estimated resonance frequency and a set of parameters that represents a predetermined reference system; and a transmitter circuit adapted to transmit a response signal to the NFC reader device utilizing active load modulation, wherein the phase value is used to align the phase of the response signal with the phase of the reader signal.

11. The device according to claim 10, wherein the phase determining circuit is further adapted to:

calculate a discrete Fourier transform for at least a part of the received reader signal; and estimate the resonance frequency based on a first and a second value of the discrete Fourier transform, wherein the first value corresponds to a first frequency and the second value corresponds to a second frequency.

12. The device according to claim 11, wherein the phase determining circuit is further adapted to:

calculate a ratio between a magnitude of the first value and a magnitude of the second value; and apply a first function to the calculated ratio to estimate the resonance frequency.

13. The device according to claim 12, wherein the first function maps the calculated ratio to a dominant pole of the system corresponding to the coupled card antenna and reader antenna.

14. The device according to claim 11, wherein the first frequency corresponds to one of an upper sideband and a lower sideband of the subcarrier modulation, and wherein the second frequency corresponds to the other one of the upper sideband and the lower sideband of the subcarrier modulation.

15. The device according to claim 10, wherein the subcarrier modulation comprises a square wave at a subcarrier frequency.

16. The device according to claim 10, wherein the phase determining circuit is further adapted to apply a second function to the estimated resonance frequency and the set of parameters representing the reference system in order to determine the phase value.

17. The device according to claim 16, wherein the second function is a predetermined function obtained by training measurements within the reference system.

18. The device according to claim 10, further comprising a selecting circuit adapted to select the set of parameters from a plurality of sets of parameters, wherein each set of parameters in the plurality of sets of parameters represents one of a plurality of reference systems.

19. An NFC system, comprising:

an NFC reader device having a reader antenna; and an NFC card emulating device adapted to communicate with the NFC reader device utilizing active load modulation, the NFC card emulating device comprising:

a card antenna adapted to couple with the reader antenna;

a receiver circuit adapted to receive a reader signal from the NFC reader device through coupling of the card antenna and the reader antenna, the reader signal comprising a subcarrier modulation;

a phase determining circuit adapted to:

estimate a resonance frequency of a system corresponding to the coupled card antenna and reader antenna based on the received reader signal; and determine a phase value based on the estimated resonance frequency and a set of parameters that represents a predetermined reference system; and a transmitter circuit adapted to transmit a response signal to the NFC reader device utilizing active load modulation, wherein the phase value is used to align the phase of the response signal with the phase of the reader signal.

\* \* \* \* \*